June 3, 1930.  H. T. THOMAS  1,761,161
WINDSHIELD
Filed Jan. 18, 1926
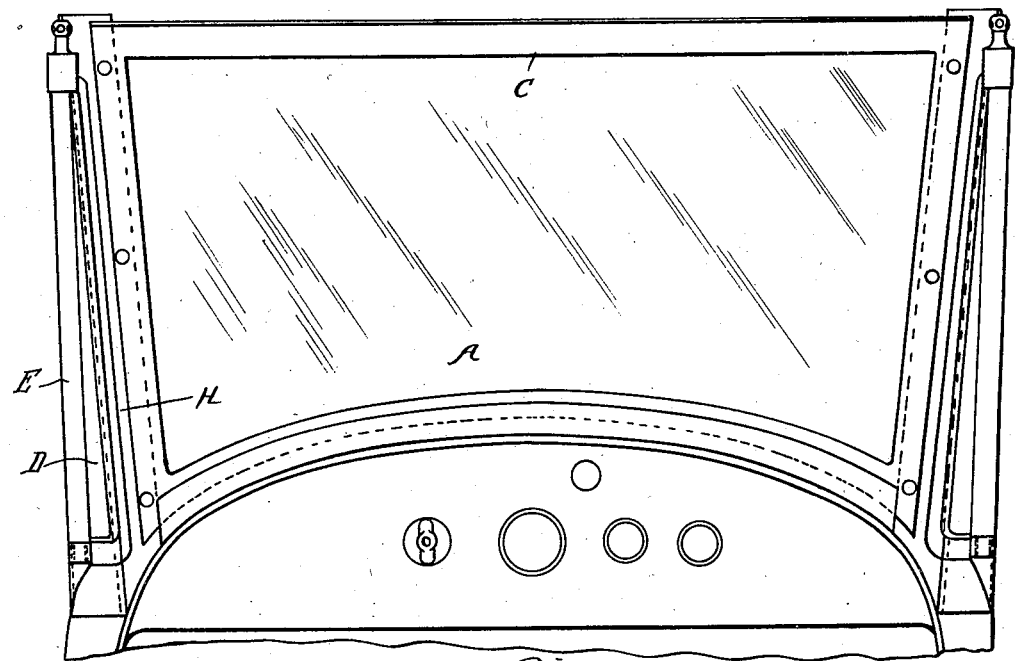
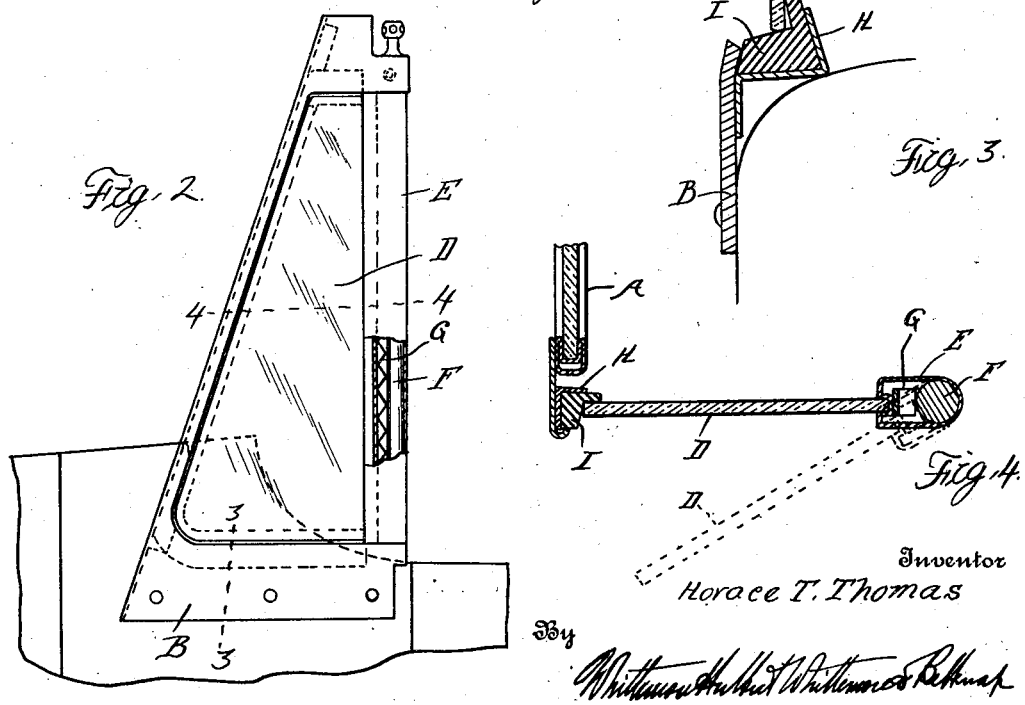
Inventor
Horace T. Thomas Patented June 3, 1930

1,761,161

UNITED STATES PATENT OFFICE

HORACE T. THOMAS, OF LANSING, MICHIGAN, ASSIGNOR TO REO MOTOR CAR COMPANY, OF LANSING, MICHIGAN, A CORPORATION OF MICHIGAN

WINDSHIELD

Application filed January 18, 1926. Serial No. 82,099.

The invention relates to windshields particularly designed for use on open body cars and of that type comprising a front shield and side wings.

It is the object of the invention to obtain a construction which permits of adjustment of the side wings so as to secure varying effects as hereinafter set forth.

In the drawings;

Figure 1 is a rear elevation of the windshield.

Figure 2 is a side elevation thereof.

Figure 3 is a section on the line 3—3 of Figure 2.

Figure 4 is a section on the line 4—4 of Figure 2.

A is the front windshield of any suitable construction but preferably arranged on an inclined plane. B are side frames secured to the frame C of the main shield A and also rigidly secured to the body of the vehicle. These frames B are of a triangular shape having their front edges inclined to correspond to the inclination of the front shield and the rear edges vertical. D are glass panels fitting within the frames B and pivotally secured thereto by a tubular frame bar E which engages a stationary post F forming the rear side of the frame B. The bar E has a channel portion which receives and secures the panel D and a tubular portion which is sleeved upon the post F. There is also a tensioning device preferably formed of a zig-zag spring strip G which is placed in the tube at one side of the post F to exert a resilient tension thereon. H is a strip surrounding the triangular opening in the frame B forming a retaining seat for a cushion stop I against which the glass panel rests.

With the construction as described the glass panels D are normally positioned in the frame B so as to rest upon the cushion stop I which forms a weather proof sealing joint therewith. In this position the side shields supplement the front shield in deflecting the wind from the seat. If, however, it is desired to have a limited ventilation in rear of the shield the panels may be moved angularly swinging on the pivot F to a position where the front edge is spaced from the stop I. The side shields will then act as deflectors for directing a portion of the current of air inward and the amount of air so deflected may be varied as desired. In whatever position the panels D may be adjusted they will be retained in this position by the frictional engagement of the bar E with the post F caused by the resilient strip G.

What I claim as my invention is:

1. The combination with a vehicle body having a front windshield, of a separate side frame secured to the side body in fixed spaced relation to said front shield, the said side frame being provided with a laterally extending shield engaging the front windshield and a transparent panel pivotally attached to the rear edge of said side frame and angularly adjustable with relation to said front shield.

2. The combination with a front windshield arranged in an inclined plane, of a side frame rigidly secured in fixed relation to said front shield, a transparent panel having a vertically extending rear edge and a front edge inclined to correspond with the inclination of said windshield, said panel being pivotally secured at its vertical edge and being angularly adjustable in relation to said frame, and a zigzag spring strip adjacent the vertical edge of the said panel for maintaining the same in different positions of adjustment.

3. The combination with a front windshield arranged in an inclined plane, of a side frame rigidly attached in fixed relation to said front shield and providing an inclined front bar and horizontally extending top and bottom bars, a vertical post connecting the rear ends of said horizontal bars, a bar pivotally mounted on said vertical post and a transparent panel secured to the latter bar and adjustable therewith in angular relation to said frame.

4. The combination with a front windshield arranged in an inclined plane, of a side frame rigidly secured in fixed relation to said front shield and providing an inclined front bar and horizontally extending top and bottom bars, a post detachably connecting the rear ends of said top and bottom bars, a tubular member sleeved on said post, a transparent panel mounted on said tubular member and angularly adjustable in relation to said frame, and friction means for holding said panel in different positions of adjustment.

5. The combination with a front windshield arranged in an inclined plane, of a side frame rigidly secured in relation to said front shield and comprising an inclined front bar and horizontally extending top and bottom bars, a post connecting the rear ends of said top and bottom bars, a tubular member sleeved on said post, a zig-zag resilient member interposed between said post and tubular member to form a friction resistance, and a transparent panel mounted on said tubular member and adjustable therewith into different angular relations to said frame.

6. The combination with a front windshield, of a side frame having a frame bar arranged adjacent the said front shield, a tubular member sleeved on the said frame bar, a transparent panel carried by the said tubular member and a spring arranged within the said tubular member and engaging the frame bar for holding the transparent panel in different positions of adjustment.

7. The combination with a front windshield, of a side frame having a frame bar arranged in spaced relation to the said front shield, a tubular member sleeved on the said frame bar, a transparent panel carried by the said tubular member, the said panel being adjustable from a position where its front edge is adjacent the said front shield to a position where it is separated therefrom, and means for maintaining the transparent panel in different positions of adjustment, said means including a spring within the said tubular member the said spring having oppositely extending portions respectively engaging the said frame bar and the interior of the said tubular member.

8. The combination with a front windshield, of a side frame having a frame bar arranged in spaced relation to the said front shield, a tubular member sleeved on the said frame bar, a transparent panel carried by the said tubular member, the said transparent panel being angularly adjustable from a position where its front edge is adjacent to said front shield to a position where it is spaced therefrom, and means for maintaining the transparent panel in different positions of adjustment, said means including a spring having portions engaging the said frame bar and the interior of the said tubular member for frictionally preventing rotation of the tubular member with respect to the said frame bar.

In testimony whereof I affix my signature.

HORACE T. THOMAS.